(12) United States Patent
Xiao et al.

(10) Patent No.: US 8,717,898 B2
(45) Date of Patent: May 6, 2014

(54) METHOD AND APPARATUS FOR CALCULATING PACKET ARRIVAL TIME INTERVAL

(75) Inventors: Jie Xiao, Shenzhen (CN); Bian Wu, Shenzhen (CN); Fengbo Wu, Shenzhen (CN); Chen Yu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 104 days.

(21) Appl. No.: 13/388,966

(22) PCT Filed: Sep. 22, 2009

(86) PCT No.: PCT/CN2009/074097
§ 371 (c)(1),
(2), (4) Date: Feb. 3, 2012

(87) PCT Pub. No.: WO2011/014998
PCT Pub. Date: Feb. 10, 2011

(65) Prior Publication Data
US 2012/0140668 A1 Jun. 7, 2012

(30) Foreign Application Priority Data
Aug. 4, 2009 (CN) .......................... 2009 1 0164032

(51) Int. Cl.
*H04L 12/26* (2006.01)
*H04L 12/56* (2006.01)

(52) U.S. Cl.
CPC .................................... *H04L 47/215* (2013.01)
USPC ....................... 370/235.1; 370/231; 370/252

(58) Field of Classification Search
None
See application file for complete search history.

(56) References Cited

U.S. PATENT DOCUMENTS 6,192,032 B1 2/2001 Izquierdo
6,195,361 B1 * 2/2001 Kondoh et al. ............... 370/412
(Continued)

FOREIGN PATENT DOCUMENTS

CN 1536815 A 10/2004
CN 101110716 A 1/2008

OTHER PUBLICATIONS

IPRP/WO for related PCT/CN/2009/074097 and its English translation, issued Feb. 7, 2012.
(Continued)

*Primary Examiner* — Hassan Kizou
*Assistant Examiner* — Tejis Daya
(74) *Attorney, Agent, or Firm* — Ladas & Parry, LLP

(57) ABSTRACT

A method and an apparatus for calculating packet arrival time interval are provided by the present invention. In the above-mentioned method, when the current packet arrives, system current time $T_2$ is read from a timer, and the arrival time $T_1$, recorded in an external RAM, of previous packet of the flow to which the current packet belongs is read (301), wherein the timer implements a cycle timing with a period of preset time period $T_{max}$, the preset time period $T_{max}$ is larger than or equal to the time for filling the maximum depth of the token bucket of the flow at the minimum token injection rate; a current flag bit, recorded in an internal RAM, of the flow to which the current packet belongs is read (303), wherein the current flag bit is used for indicating the number of cycles of the timer between the system current time $T_2$ and the arrival time $T_1$ of previous packet; and the arrival time interval of the present packet is calculated according to the system current time $T_2$, the arrival time $T_1$ of previous packet and the current flag bit (305). Application of the present invention can reduce the consumption of the internal RAM and improve the operability for realizing by the hardware chips.

17 Claims, 5 Drawing Sheets

(56) References Cited

U.S. PATENT DOCUMENTS

| | | | |
|---|---|---|---|
| 7,046,685 B1* | 5/2006 | Matsuoka et al. | 370/409 |
| 8,385,205 B2* | 2/2013 | Kenney | 370/235.1 |
| 2003/0069970 A1* | 4/2003 | Kim et al. | 709/225 |
| 2003/0128667 A1* | 7/2003 | Matsufuru | 370/230.1 |
| 2004/0228274 A1* | 11/2004 | Yazaki et al. | 370/229 |
| 2005/0094572 A1* | 5/2005 | Mimura et al. | 370/252 |
| 2006/0126637 A1* | 6/2006 | Vaananen et al. | 370/395.4 |
| 2006/0159028 A1* | 7/2006 | Curran-Gray et al. | 370/252 |
| 2008/0008095 A1* | 1/2008 | Gilfix | 370/235 |
| 2008/0068992 A1* | 3/2008 | Xie et al. | 370/230 |
| 2009/0147683 A1* | 6/2009 | Mustafa | 370/235 |

OTHER PUBLICATIONS

ISR for related PCT/CN/2009/074097 and its English translation, mailed May 6, 2010.

* cited by examiner

US 8,717,898 B2

METHOD AND APPARATUS FOR CALCULATING PACKET ARRIVAL TIME INTERVAL

CROSS-REFERENCE TO RELATED APPLICATIONS

This application is the U.S. National Stage of International Patent Application No. PCT/CN2009/074097 filed on Sep. 22, 2009, which claims priority to Chinese Patent Application Number 200910164032.4 filed on Aug. 4, 2009, the disclosures of which are hereby incorporated by reference in their entireties.

FIELD OF THE INVENTION

The present invention relates to mobile communication field, and in particular to a method and an apparatus for calculating packet arrival time interval.

BACKGROUND OF THE INVENTION

Since the packet arrival time interval in data network is in random, the burst data traffic which has exceeded the processable capacity of a network node may lead to data congestion when passing through the network node.

Currently, to avoid the impact of the burst data traffic on communications, the packet traffic policing method based on token bucket is generally used. FIG. 1 is the schematic diagram of the principle of the packet traffic policing method based on token bucket. As shown in FIG. 1, tokens are injected to the token bucket with a capacity of V bytes at an injection rate of v bytes/s, wherein if the token bucket is full, the injected tokens will be discarded. When a packet arrives, if the packet length is less than the quantity of tokens in the token bucket, the token quantity of the token bucket is deducted by the packet length and the packet is allowed to pass through; otherwise, the packet will be discarded. The above-mentioned v refers to the average traffic allowing the packet to pass through, and the token bucket capacity V refers to the burst traffic allowing the packet to pass through.

In the packet traffic policing method based on token bucket, the constant interval of token injection should be firstly determined when realizing token injection. If the constant interval is larger, dramatic fluctuation may be caused in the packet passing rate, thus failing to achieve the traffic policing effect. If the constant interval is small herein, the system will need to perform adding the tokens frequently, which can consume a lot of operation resources.

Currently, in order to make the constant interval more reasonable in the related art, a method for performing adding token only when the packet arrives is provided. In this method, every time a packet arrives, the token quantity which should be accumulated in the token bucket within the time interval between the arrival time of the current packet and the arrival time of the previous packet will be calculated. Specifically, a timer is set to record the arrival time of a packet each time when the packet arrives. When a packet arrives, the arrival time interval of the present packet will be calculated by using the arrival time of current packet and that of the previous packet. Then, within this period of time, the accumulated token quantity of the token bucket=the arrival time interval of the packet×the injection rate of the token. After the accumulated token quantity is added into the token bucket, the processing for the packet length judgment is performed. When using this method, if the arrival time interval of a packet is too long, the timer will overflow, thus leading to an error in the accumulated token quantity calculation.

In the existing network nodes, the arrival packets shall be classified according to attributes, such as source address, destination address and so on, wherein the packets classified into the same one category are defined as a flow. As to a large-capacity network node, the flow quantity may be tremendous, so it is needed to distinguish various flows and set different token bucket capacities and token injection rates. Based on this situation, a method for traffic policing of token bucket packet which is easily realized by hardware chips is provided in the related art. In this method, the maximum timer depth $T_{max}$ needed by the system is firstly calculated. For a system, the time period during which the token bucket with maximum depth is filled up at a minimum token injection rate is the maximum timer depth needed by the system. As to any flow in a system, when the arrival time interval of two packets is larger than this time period, the token bucket has overflowed obviously. At this moment, it is only necessary to fill up directly the corresponding token bucket but without calculating the accumulated token quantity.

Specifically, in this method, a dual-port Random Access Memory (RAM) is used to calculate the packet arrival time interval of each flow, wherein the dual-port RAM records the arrival time of previous packet of each flow and the carry flag of the timer (each time the timer expires, the carry flag bit is reversed) at this arrival time, and at the same time an overflow flag bit is provided for overflow scanning processing. The two access ports of the dual-port RAM are used to record packet arrival time and to perform overflow scanning processing respectively. The above-mentioned overflow scanning processing is to scan for the arrival time of all packets stored in the dual-port RAM in sequence, and the overflow flag bit is set as 0 each time of recording the arrival time of a new packet, while this overflow flag bit is set as 1 if the constant interval is found to have overflowed during the process of scanning. It is needed to scan all the flows for one time within the time $T_{max}$, wherein when scanning, the packet arrival time $T_1$ of the flow to be scanned is read out and is compared with the current timer time $T_2$. If the overflow flag which is read out is 0, $T_1$ and $T_2$, and the carry flag of $T_1$ and the carry flag of $T_2$ are compared, wherein if the carry flags are the same and $T_2 > T_1$, it indicates that the token bucket has not overflowed from $T_1$ to the current time, and if the two carry flags are the same and $T_2 < T_1$, it indicates that the timer has implemented for two cycle and the token bucket has overflowed from $T_1$ to the current time, and if the two carry flags are different and $T_2 > T_1$, it indicates that the timer has implemented for one cycle and the token bucket has overflowed from $T_1$ to the current time, and if the two carry flags are the different and $T_2 < T_1$, it indicates that the timer has implemented for one cycle and the token bucket has not overflowed from $T_1$ to the current time. If the overflow flag which is read out is 1, it illustrates that the token bucket has overflowed and no operation is performed. Since the scanning interval is $T_{max}$, for any flow the arrival time of the lately updated packet may be all marked as "token bucket overflow" within the time $2T_{max}$. After a packet arrives, the arrival time interval of the packet is calculated by the same judgment method. In this way, when the packet arrival time interval is less than $2T_{max}$, whether the token bucket has overflowed can be correctly judged; while for the situation that the packet arrival time interval is larger than $2T_{max}$, it can be solved by performing the overflow scanning processing.

In this method, a dual-port RAM needs to be used, but over ten thousand different flows shall be identified in the existing network node, and the speed limit rates of these diversified flows may be different million times. Therefore, the width of the timer used for calculating the packet arrival time interval may be up to over 20 bits. As to hardware chips, the available dual-port RAM quantity inside the chips is limited. When the flow density is very high (16,000 flows) and the width of the timer is very wide (over 20 bits), a large storage space is needed, so unfavorable to the realization by means of an internal RAM. Nevertheless, if a external RAM (connected outside) is used, the processing speed of packet may be affected since the scanning processing has certain correlation with packet interval calculation processing (the overflow flag bit needs to be considered) and the operation delay of the external RAM is relatively larger.

SUMMARY OF THE INVENTION

In view of this, the present invention provides an improved solution for calculating packet arrival time interval, in order to solve the problem in the conventional art that both the internal realization and the external realization are not prone to be attained since a large storage space is required when a dual-port RAM is used for realization.

According to one aspect of the present invention, a method for calculating packet arrival time interval is provided, wherein this method is used to calculate the time interval of the packet of each flow arriving at the network node so as to determine the quantity of tokens in the token bucket of each flow.

The method for calculating packet arrival time interval according to the present invention comprises: when the current packet arrives, reading system current time $T_2$ from a timer, and reading the arrival time $T_1$, recorded in an external RAM, of previous packet of the flow to which the current packet belongs, wherein when the timer implements a cycle timing with a period of preset time period $T_{max}$, the preset time period $T_{max}$ is larger than or equal to the time for filling the maximum depth of the token bucket of the flow at the minimum token injection rate; reading a current flag bit, recorded in an internal RAM, of the flow to which the current packet belongs, wherein the current flag bit is used for indicating the number of cycles of the timer between the system current time $T_2$ and the arrival time $T_1$ of the previous packet; and calculating the arrival time interval of the present packet according to the system current time $T_2$, the arrival time $T_1$ of the previous packet and the current flag bit.

According to another aspect of the present invention, an apparatus for calculating packet arrival time interval is provided, wherein this apparatus is used to calculate the time interval of the packet of each flow arriving at the network node so as to determine the quantity of tokens in the token bucket of each flow.

The apparatus for calculating packet arrival time interval according to the present invention comprises: an external RAM, a timer, an internal RAM, a reading module and a calculating module, wherein the external RAM is configured to record the arrival time $T_1$ of the latest packet of each flow with the flow identifier of the each flow as the address; the timer is configured to implement a cycle timing with a period of preset time period $T_{max}$, wherein the preset time period $T_{max}$ is larger than or equal to the time for filling the maximum depth of the token bucket of each flow at the minimum token injection rate; the internal RAM is configured to record the current flag bit of the each flow with the identifier of the each flow as the address, wherein the current flag bit is used for indicating the number of cycles of the timer between the system current time and the arrival time of previous packet of the each flow; the reading module is configured to read the system current time $T_2$ from the timer, the arrival time $T_1$ of previous packet recorded in the external RAM and corresponding to the flow to which current packet belongs, and the current flag bit recorded in the internal RAM and corresponding to the flow to which the current packet belongs, when the current packet arrives; and the calculating module is configured to calculate the arrival time interval of the present packet according to the system current time $T_2$, the arrival time $T_1$ of previous packet and the current flag bit which are read by the reading module.

By at least one of the solutions above of the present invention, the arrival time of previous packet of each flow is recorded into the external RAM by using an internal RAM to store the flag bit of each flow, thus reducing the consumption of internal RAM and improving the operability for realization by hardware chips.

Other features and advantages of the present invention will be described in the following description and partly become obvious from the description, or be understood by implementing the present invention. The objects and other advantages of the present invention can be realized and obtained through the structures specified by the description, claims and drawings.

BRIEF DESCRIPTION OF THE DRAWINGS

The accompanying drawings disclosed herein provide a further understanding of the present invention and form a part of the specification, illustrate the present invention together with the exemplary embodiments without limiting the scope of the present invention, wherein.

DETAILED DESCRIPTION OF THE EMBODIMENTS

Functional Overview

In the packet traffic policing method based on token bucket by using hardware chips for realization in the conventional art, since the RAM in the hardware chips needs to record the arrival time of previous packet of each flow and the carry flag of the timer at this moment, and also needs to perform the overflow scanning processing simultaneity, with a great quantity of flows, this RAM needs large storage space, but the available RAM quantity inside the chip is limited, so the operability is poor in real application. For this problem, the embodiments of the present invention provide an improved solution to calculating packet arrival time interval. In the embodiments of the present invention, an internal RAM is configured to record the flag bit of each flow, and a large-capacity external RAM is also provided to record the arrival time of previous packet of each flow. When a packet arrives, the system current time $T_2$ is read and the arrival time $T_1$, recorded in the external RAM, of previous packet of the flow to which the current packet belongs is read, and the flag bit, recorded in the internal RAM, of the flow to which the current packet belongs is read. Afterwards, the arrival time interval at present packet time is calculated according to the individual parameters which are read.

The embodiments in the present invention and the features in the embodiments can be mutually combined if no conflict occurs.

A detailed description is given to the preferred embodiments of the invention with reference to the accompanying drawings. It should be understood that the preferred embodiment of the present invention is described only for the purpose of illustration, not for limiting the present invention.

According to the embodiments of the present invention, an apparatus for calculating packet arrival time interval is firstly provided, wherein this apparatus is used to calculate the time interval when the packet of each flow arrives at the network node so as to determine the token quantity of the token bucket of each flow.

Figure 1:
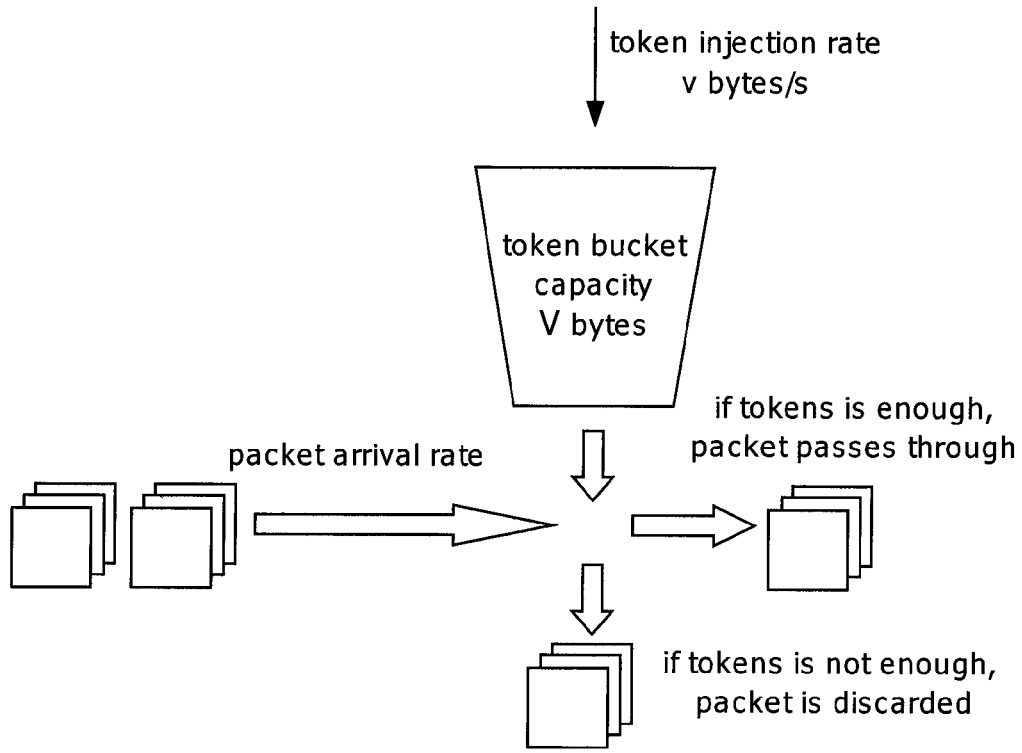
FIG. 1 is a schematic diagram of the principle of the packet traffic policing method based on token bucket in the related art.
Figure 2:
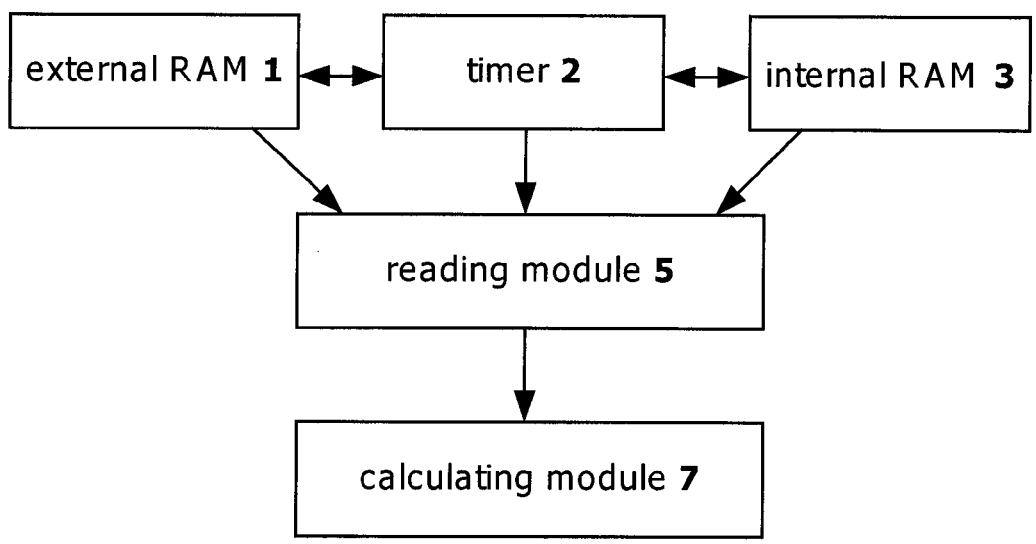
FIG. 2 is a structural schematic diagram of the apparatus for calculating packet arrival time interval according to the embodiments of the present invention.

FIG. 2 is the structural schematic diagram of the apparatus for calculating packet arrival time interval according to the embodiments of the present invention. As shown in FIG. 2, the apparatus for calculating packet arrival time interval according to the embodiments of the present invention primarily comprises: an external RAM 1, a timer 2, an internal RAM 3, a reading module 5 and a calculating module 7, wherein the external RAM 1 is configured to record the arrival time $T_1$ of the latest packet of each flow with the flow identifier of the each flow as the address; the timer 2 is configured to implement a cycle timing with a period of preset time period, wherein the preset time period is larger than or equal to the time of filling the maximum depth of the token bucket of each flow at the minimum token injection rate; the internal RAM 3 is configured to record the current flag bit of each flow with the flow identifier of each flow as the address, wherein the current flag bit is used for indicating the number of cycles of the timer 2 between the system current time and the arrival time of previous packet of each flow; the reading module 5, connected with the external RAM 1, the timer 2 and the internal RAM 3 respectively, is configured to read the system current time $T_2$ from the timer 2, the arrival time $T_1$ of previous packet recorded in the external RAM 1 and corresponding to the flow to which the current packet belongs, and the current flag bit recorded in the internal RAM and corresponding to the flow to which the current packet belongs when the present packet arrives; and the calculating module 7, connected with the reading module 5, is configured to calculate the arrival time interval of the present packet according to the system current time $T_2$, the arrival time $T_1$ of previous packet and the flag bit which are read by the reading module 5.

Specifically, the internal RAM 3 may comprise two ports: a first port, configured to return to the reading module 5 the current flag bit of the flow to which the current packet belongs and to set the current flag of the flow as 1 when the current packet arrives; and a second port, configured to scan the flag bit of each flow which is recorded in the internal RAM with the period of preset time period $T_{max}$, wherein the value of the flag bit is increased by 1 whenever a flag bit is scanned.

Preferably, the bit width of the flag bit of each flow is 2, with the maximum value being 3. Then, according to the number n of flows the system needs to support, the above internal RAM 3 can be a 2 bit×n dual-port RAM. Specifically, the internal RAM 3 is realized by hardware chips, wherein one port of the dual-port RAM is configured to read the flag bit corresponding to the flow to which the new packet belongs and to set the flag bit as 1 after reading the flag bit when the new packet arrival; and the other port, configured to scan processing, performs the scan for the flag bit of each flow with the period of $T_{max}$. Each time a flag bit is scanned; the value of the flag bit is increased by 1. If the value of the flag bit reaches the maximum value, the flag bit value is not increased any more.

When the external RAM 1 records the arrival time of previous packet of each flow and the internal RAM 3 records the flag bit of each flow, the recording can be performed with the flow identifier of each flow as the address. Preferably, the flow identifier may be a serial number of the flow. Therefore, in implementation, the external RAM 1 can be configured as a large-capacity external RAM, with the address space being n and the bit width greater than that of the system timer.

The apparatus provided according to the embodiments of the present invention can reduce the RAM consumption in the chips and also simplify the complexity of algorithm since the internal RAM does not need to read the arrival time of previous packet when scanning the flag bit.

According to the embodiments of the present invention, a method for calculating packet arrival time interval is further provided, wherein this method is used to calculate the time interval when the packet of each flow arrives at the network node so as to determine the token quantity of the token bucket of each flow. The method can be realized by the abovementioned apparatus.

Figure 3:
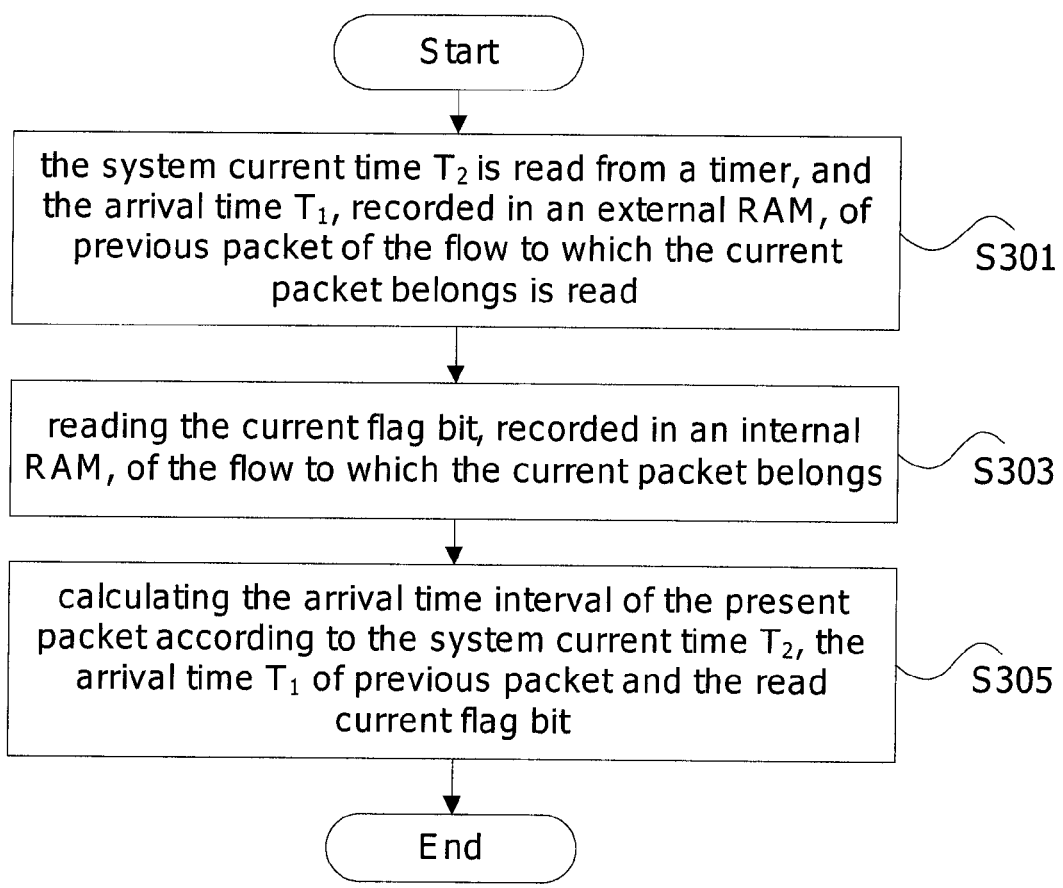
FIG. 3 is a flowchart of the method for calculating packet arrival time interval according to the embodiments of the present invention.

FIG. 3 is the flowchart of the method for calculating packet arrival time interval according to the embodiments of the present invention. As shown in FIG. 3, the method for calculating packet arrival time interval according to the embodiments of the present invention mainly comprises the following steps (Step S301-Step S305).

Step S301: when a current packet arrives, the system current time $T_2$ is read from a timer, and the arrival time $T_1$, recorded in an external RAM, of previous packet of the flow to which the current packet belongs is read, wherein when the timer implements a cycle timing with a period of preset time period $T_{max}$, the preset time period $T_{max}$ is larger than or equal to the time for filling the maximum depth of the token bucket of the flow at the minimum token injection rate.

Specifically, a timer is provided for the system to record packet arrival time of each flow and to implement continuously cycle timing with a period of preset time period $T_{max}$. The time $T_{max}$ that the timer implements one cycle is greater than the time that the token bucket of maximum depth is filled up at the minimum token injection rate. As to any flow in a system, when the arrival time interval of two packets belonging to this flow is greater than this time $T_{max}$, the token bucket has overflowed obviously. At the moment, it only needs to fill the corresponding token bucket directly without calculating the accumulated token quantity.

In the specific embodiments, when the external RAM records the arrival time of previous packet of each flow and the internal RAM records the flag bit of each flow, the recording can be performed with the flow identifier of each flow as the address. Therefore, when reading the arrival time, recorded in the external RAM, of previous packet of the flow to which the current packet belongs, firstly it is possible to obtain the flow identifier of the flow to which the current packet belongs, and then read the arrival time corresponding to the flow identifier and recorded in the external RAM, namely, the arrival time of previous packet of the flow, with the flow identifier as the address.

Furthermore, after reading the arrival time of previous packet of the flow to which the current packet belongs, the arrival time (namely the current system time) of current packet is written into the external RAM with the flow identifier of the flow to which the current packet belongs as the address.

Step S303: reading a current flag bit, recorded in an internal RAM, of the flow to which the current packet belongs, wherein the current flag bit is used for indicating the number of cycles of the timer between the system current time $T_2$ and the arrival time $T_1$ of previous packet.

Specifically, the flag bit of the arrival time of previous packet corresponding to each flow may be recorded in the internal RAM with the flow identifier of each flow as the address. When the current packet arrives, firstly the flow identifier of the flow to which the current packet belongs is obtained, and then the current flag bit which corresponds to the flow identifier and is recorded in the internal RAM is read according to the flow identifier. Moreover, after the step of reading the current flag bit recorded in the internal RAM and corresponding to the flow to which the current packet belongs, the flag bit which corresponds to the flow identifier and is recorded in the internal RAM is set as 1 with this flow identifier as the address. Namely, the current packet is regarded as previous packet of the next packet, to update the flag bit which records the arrival time of the previous packet.

In the specific embodiments, whenever the value of the system timer is 0, a new round of flag bit scanning and updating will be started. Specifically, scanning may be performed in accordance with the flow identifier of each flow. Preferably, the flow identifier is a serial number of flow, namely, an index number allocated by the system for each flow.

Therefore, scanning may be performed according to the index number of each flow during the flag bit scanning and updating. Specifically, the scanning starts from the flow index number 0, and the corresponding flag bit is read with the index number of the current scanned flow as the address. When the flag bit is '11', the flag bit value is kept unchanged; otherwise the flag bit value will be increased by 1. After the index number of the current scanned flow being increased by 1, continuously the next flow is updated until all flows are scanned for one time, then the flag bit scanning in this turn ends.

From the procedure of the above flag bit scanning and updating, it can be seen that as to any flow, the interval between the updating of two flat bits must be the cycle time $T_{max}$ of the system timer. Therefore, when the flag bit of a flow is '01', the interval between the system current time and the arrival time of previous packet must be less than $T_{max}$; when the flag bit of a flow is '10', the interval between the system current time and the arrival time of previous packet must be less than $2T_{max}$ and more than $T_{max}$; when the flag bit of a flow is '11', the interval between the system current time and the arrival time of previous packet must be more than $2T_{max}$.

Preferably, the flow identifier of each flow in the embodiments of the present invention is the serial number of each flow.

Step S305: calculating the arrival time interval of the present packet according to the system current time $T_2$, the arrival time $T_1$ of previous packet and the read current flag bit.

Specifically, according to the above operation of the flag bit scanning and updating, it can be known that: if the current flag bit is '01', namely the value of the current flag bit is 1, the arrival time interval of the present packet is $(T_2-T_1)$; if the flag bit is '10', namely the value of the current flag bit is 2, and $T_2 \geq T_1$, the token bucket has overflowed and shall be filled up directly; if the flag bit is '10' and $T_2 < T_1$, the arrival time interval of the present packet is $(T_{max}+T_2-T_1)$; if the flag bit is '11', namely the value of the current flag bit is 3, the token bucket has overflowed and shall be filled up directly.

The method for calculating packet arrival time interval according to the embodiments of the present invention can use the flag bit recorded in the internal RAM and the arrival time of previous packet recorded in the external RAM respectively to calculate the arrival time internal of the present packet.

To further understand the present invention, the following embodiments are used to illustrate the technical solution of the present invention.

Embodiment I

This Embodiment is explained by means of the procedure of updating the flag bit recorded in the internal RAM and the arrival time of previous packet recorded in the external RAM when the current packet arrives.

Figure 4:
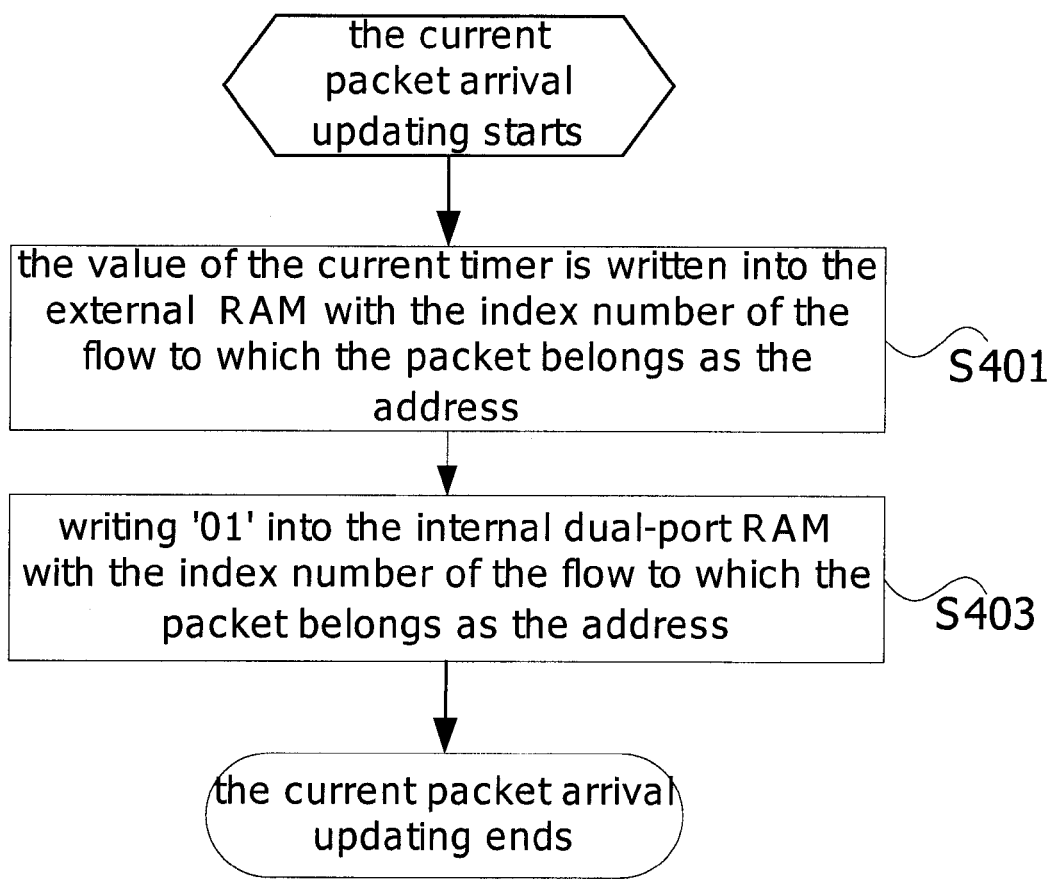
FIG. 4 is a flowchart of Embodiment I.

FIG. 4 is the flowchart of this Embodiment. As shown in FIG. 4, the procedure of updating the flag bit recorded in the internal RAM and the arrival time of previous packet recorded in the external RAM when the current packet arrives mainly comprises the following steps.

Step S401, when the current packet arrives, the value of the current system timer is written into the external RAM with the serial number of the flow to which the packet belongs as the address.

Step S403, the flag bit of the internal dual-port RAM is set as 1 with the serial number of the flow to which the packet belongs as the address. In the above steps, the order of Step S401 or Step S403 is not limited. At this time, the packet arrival time updating ends.

Embodiment II

This Embodiment describes the procedure of scanning the flag bit of the arrival time of previous packet of each flow recorded in the internal RAM.

Figure 5:
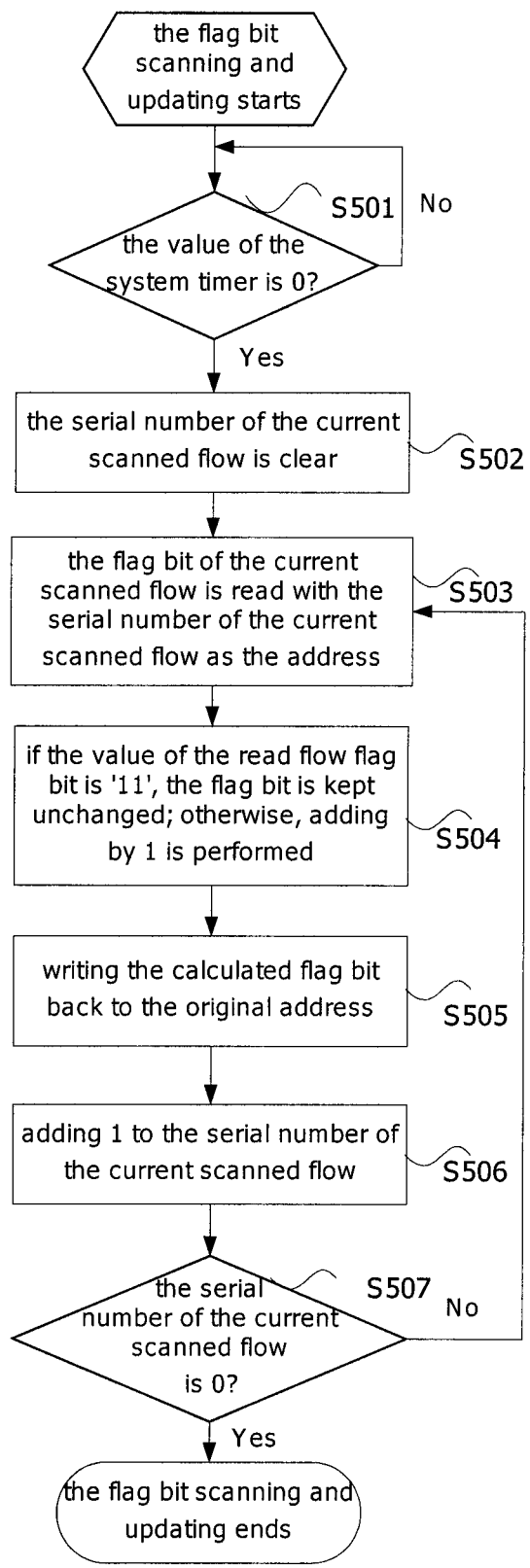
FIG. 5 is a flowchart of Embodiment II.

FIG. 5 is the flowchart of this Embodiment. As shown in FIG. 5, in this embodiment, the procedure of scanning and updating the flag bit of the arrival time of previous packet of each flow recorded in the internal RAM mainly comprises the following steps.

Step S501: after the flag bit scanning and updating procedure begins, it is judged whether the value of the system timer is 0, wherein if the judgment result is yes, Step S502 is performed, otherwise, the judgment is continued.

Step S502: when the counting value of the system timer is 0, a new round of flag bit scanning and updating is started up and the index number of the current scanned flow is cleared to 0.

Step S503: the flag bit of the current scanned flow is read with the index number of the current scanned flow as the address.

Step S504: if the read flow flag bit is '11', the flag bit is kept unchanged; otherwise, adding by 1 is performed.

Step S505: writing the calculated flag bit into the original address again.

Step S506: adding 1 to the index number of the current scanned flow.

Step S507: judging whether the serial number of the current scanned flow is 0, wherein if the serial number of the current scanned flow is 0, this round of flag bit scanning will end, otherwise, returning to Step S503, and proceeding with updating the next flow until all the flows are scanned once.

Embodiment III

In this Embodiment, the procedure of calculating the arrival time interval of the present packet after the current packet arrives is described.

Figure 6:
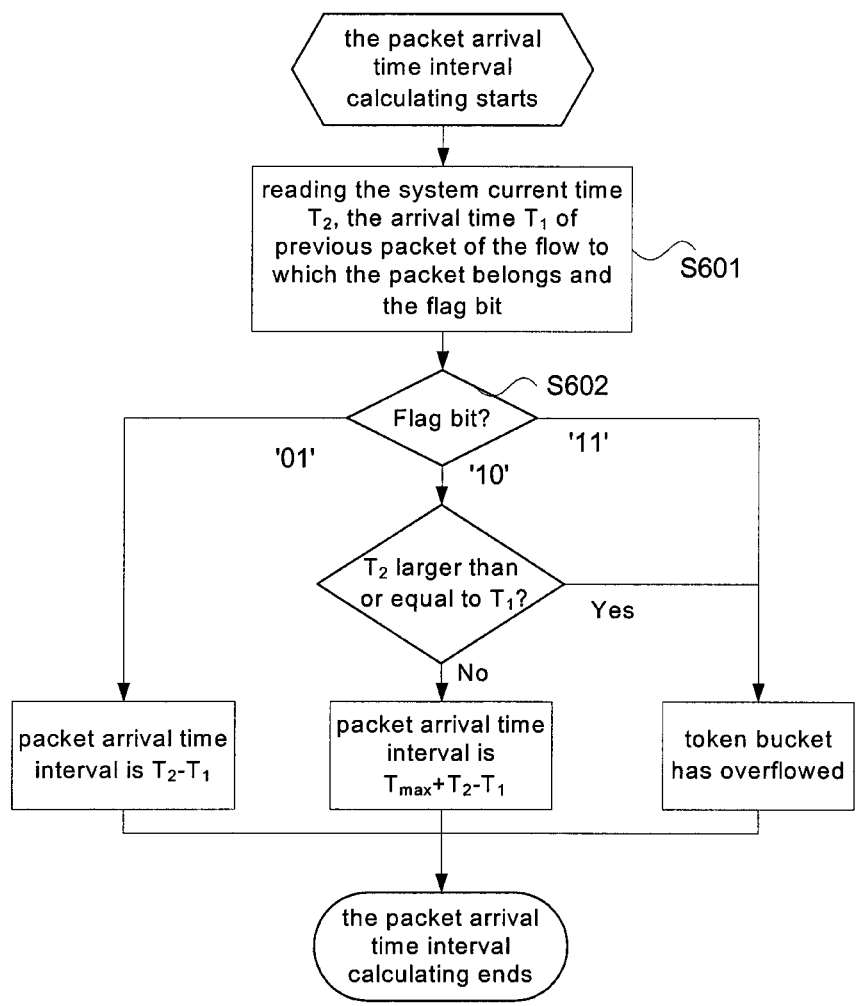
FIG. 6 is a flow chart of Embodiment III.

FIG. 6 is the flowchart of this Embodiment. As shown in FIG. 6, in this Embodiment, the procedure of calculating the arrival time interval of the present packet when the current packet arrives mainly comprises the following steps.

Step S601, recording the arrival time $T_2$ of current packet; reading the external RAM to read out the arrival time $T_1$ of previous packet of the flow to which the packet belongs; and reading the internal dual-port RAM to read out the current flag bit of the flow to which the packet belongs.

Step S602, judging the read flag bit, wherein if the flag bit is 2'b01 (namely '01' occupies 2 bits), then the present packet arrival time interval at present time is $(T_2-T_1)$; if the flag bit is 2'b10 and $T_2 \geq T_1$, the token bucket has overflowed and shall be filled up directly; if the flag bit is 2'b10 and $T_2 < T_1$, the arrival time interval of the present packet is $(T_{max}+T_2-T_1)$; and if the flag bit is 2'b11, the token bucket has overflowed and shall be filled up directly.

As mentioned above, by relying on the technical solution provided in the embodiments of the present invention, the packet arrival time field which may consume a large internal storage of chips is recorded into the external RAM, thus improving the operability for realizing by the hardware chips. Meanwhile, in the embodiments of the present invention, the calculation of time difference is implemented together with calculation of the time interval, and the time scanning and updating with relatively high execution frequency is realized by simple addition operation, thus simplifying the complexity of realization.

Above description is only to illustrate the preferred embodiments but not to limit the present invention. Various alterations and changes to the present invention are apparent to those skilled in the art. The scope defined in claims shall comprise cover any modification, equivalent substitution and improvement within the spirit and principle of the present invention.

What is claimed is:

1. A method for calculating packet arrival time interval, used to calculate the time interval of the packet of each flow arriving at the network node so as to determine the quantity of tokens in the token bucket of each flow, wherein the method comprises:
   when the current packet arrives, reading system current time $T_2$ from a timer, and reading the arrival time $T_1$, recorded in an external RAM, of previous packet of the flow to which the current packet belongs, wherein when the timer implements a cycle timing with a period of preset time period $T_{max}$, the preset time period $T_{max}$ is larger than or equal to the time for filling the maximum depth of the token bucket of the flow at the minimum token injection rate;
   reading a current flag bit, recorded in an internal RAM, of the flow to which the current packet belongs, wherein the current flag bit is used for indicating the number of cycles of the timer between the system current time $T_2$ and the arrival time $T_1$ of the previous packet; and
   calculating the arrival time interval of the present packet according to the system current time $T_2$, the arrival time $T_1$ of the previous packet and the current flag bit.

2. The method according to claim 1, wherein the step of reading the arrival time, recorded in the external RAM, of previous packet comprises:
   obtaining the flow identifier of the flow to which the current packet belongs, and reading the arrival time $T_1$ corresponding to the flow identifier and recorded in the external RAM, with the flow identifier as the address.

3. The method according to claim 1, wherein after reading the arrival time $T_1$ of the previous packet, the method further comprises:
   writing the system current time $T_2$ into the external RAM with the flow identifier of the flow to which the current packet belongs as the address.

4. The method according to claim 1, wherein the step of reading the current flag bit, recorded in the internal RAM, of the flow to which the current packet belongs comprises:
   obtaining the flow identifier of the flow to which the current packet belongs, and reading the current flag bit corresponding to the flow identifier and recorded in the internal RAM, with the flow identifier as the address.

5. The method according to claim 1, wherein after reading the current flag bit of the flow to which the current packet belongs, the method further comprises:
   obtaining the flow identifier of the flow to which the current packet belongs, and set the flag bit, corresponding to the flow identifier and recorded in the internal RAM, as 1, with the flow identifier as the address.

6. The method according to claim 5, wherein the method further comprises:
   scanning the flag bit of each flow which is recorded in the internal RAM with the period of preset time period $T_{max}$, wherein the value of the flag bit is increased by 1 each time a flag bit is scanned.

7. The method according to claim 6, wherein the bit width of each flag bit is 2, and the maximum value of the flag bit is 3, wherein if the value of the current flag bit scanned is the maximum value, the value of the current flag bit is kept unchanged, being the maximum value.

8. The method according to claim 7, wherein the step of calculating the arrival time interval of the present packet comprises:
   if the value of the current flag bit is 1, the arrival time interval of present packet being: $T_2-T_1$;
   if the value of the current flag bit is 2, and $T_2 \geq T_1$, the token bucket of the flow having overflowed and to be filled up directly;
   if the value of the current flag bit is 2, and $T_2 < T_1$, the arrival time interval of present packet being $T_{max}+T_2-T_1$; and
   if the value of the current flag bit is 3, the token bucket of the flow having overflowed and to be filled up directly.

9. The method according to claim 2, wherein the flow identifier comprises a serial number of flow.

10. An apparatus for calculating packet arrival time interval, used to calculate the time interval of the packet of each flow arriving at the network node so as to determine the quantity of tokens in the token bucket of each flow, wherein the apparatus comprises:
   an external RAM, configured to record the arrival time $T_1$ of the latest packet of each flow with the flow identifier of the each flow as the address;
   a timer, configured to implement a cycle timing with a period of preset time period $T_{max}$, wherein the preset time period $T_{max}$ is larger than or equal to the time for filling the maximum depth of the token bucket of each flow at the minimum token injection rate;
   an internal RAM, configured to record the current flag bit of the each flow with the identifier of the each flow as the address, wherein the current flag bit is used for indicating the number of cycles of the timer between the system current time and the arrival time of previous packet of the each flow; and a processor, configured to execute program units stored in a memory, the program units comprising:
    a reading module, connected to the external RAM, the timer, the internal RAM and configured to read the system current time $T_2$ from the timer, the arrival time $T_1$ of previous packet recorded in the external RAM and corresponding to the flow to which current packet belongs, and the current flag bit recorded in the internal RAM and corresponding to the flow to which the current packet belongs, when the current packet arrives; and
    a calculating module, connected to the reading module and configured to calculate the arrival time interval of the present packet according to the system current time $T_2$, the arrival time $T_1$ of previous packet and the current flag bit which are read by the reading module.

11. The apparatus according to claim 10, wherein the internal RAM comprises:
    a first port, configured to return to the reading module the flag bit of the flow to which the current packet belongs and to set the flag bit of the flow as 1, when the current packet arrives; and
    a second port, configured to scan the flag bit of each flow which is recorded in the internal RAM with the period of preset time period $T_{max}$, wherein the value of the flag bit is increased by 1 each time a flag bit is scanned.

12. The method according to claim 2, wherein after reading the arrival time $T_1$ of the previous packet, the method further comprises:
    writing the system current time $T_2$ into the external RAM with the flow identifier of the flow to which the current packet belongs as the address.

13. The method according to claim 4, wherein after reading the current flag bit of the flow to which the current packet belongs, the method further comprises:
    obtaining the flow identifier of the flow to which the current packet belongs, and set the flag bit, corresponding to the flow identifier and recorded in the internal RAM, as 1, with the flow identifier as the address.

14. The method according to claim 13, wherein the method further comprises:
    scanning the flag bit of each flow which is recorded in the internal RAM with the period of preset time period $T_{max}$, wherein the value of the flag bit is increased by 1 each time a flag bit is scanned.

15. The method according to claim 14, wherein the bit width of each flag bit is 2, and the maximum value of the flag bit is 3, wherein if the value of the current flag bit scanned is the maximum value, the value of the current flag bit is kept unchanged, being the maximum value.

16. The method according to claim 15, wherein the step of calculating the arrival time interval of the present packet comprises:
    if the value of the current flag bit is 1, the arrival time interval of present packet being: $T_2-T_1$;
    if the value of the current flag bit is 2, and $T_2 \geq T_1$, the token bucket of the flow having overflowed and to be filled up directly;
    if the value of the current flag bit is 2, and $T_2 < T_1$, the arrival time interval of present packet being $T_{max}+T_2-T_1$; and
    if the value of the current flag bit is 3, the token bucket of the flow having overflowed and to be filled up directly.

17. The method according to claim 4, wherein the flow identifier comprises a serial number of flow.

* * * * *